Patented June 12, 1934

1,963,019

UNITED STATES PATENT OFFICE 1,963,019

MANUFACTURE OF DIARYL-THIAZYL-DISULPHIDE

Marion W. Harman, Nitro, W. Va., assignor to The Rubber Service Laboratories Company, Akron, Ohio, a corporation of Ohio No Drawing. Application October 8, 1932, Serial No. 636,947

12 Claims. (Cl. 260—16)

The present invention relates to a new process for the manufacture of diaryl-thiazyl-disulphides. More particularly, the invention relates to the manufacture of diaryl-thiazyl-disulphide by reacting a mercapto-aryl-thiazole with sulphuric acid.

For example the following reactions are typical of the invention and included within the scope thereof. Reaction of sulphuric acid and 2-mercaptobenzothiazole forming dibenzothiazyl-disulphide, reaction of sulphuric acid and 2-mercapto, 5-methyl-benzothiazole forming di-5-methyl-benzothiazyl-disulphide, reaction of sulphuric acid and 2-mercapto, 5-chlor-benzothiazole forming di-5-chlor-benzothiazyl-disulphide, reaction of sulphuric acid and 2-mercapto, 6-methyl benzothiazole forming di-6-methyl-benzothiazyl-disulphide, reaction of sulphuric acid and mercaptonaphthothiazole forming di naphthothiazyl-disulphide, reaction of sulphuric acid and 2-mercapto-4-, 6-dimethyl-benzothiazole forming di-4, 6-dimethyl-benzothiazyl-disulphide, reaction of sulphuric acid and 2-mercapto-6-ethoxy-benzothiazole forming di-6-ethoxy-benzothiazyl-disulphide, reaction of sulphuric acid and 2-mercapto-6-methoxy-benzothiazole forming di-6-methoxy-benzothiazyl-disulphide, reaction of sulphuric acid and 2-mercapto-6-nitro benzothiazole forming di-6-nitro-benzothiazyl-disulphide.

The following example is to be regarded as a specific embodiment of the invention and not as a limitation thereof.

Substantially 800 parts by weight of concentrated sulphuric acid were placed in a suitable reactor and substantially 200 parts by weight of mercaptobenzothiazole having a purity of 93.4% added thereto at a temperature of substantially 10-20° C. After the addition of the mercaptan to the acid was completed, the reaction mixture was heated slowly to substantially 90-100° C. with agitation and maintained thereat until sulphur dioxide had ceased to be evolved. Thereupon the reaction mass was cooled and slowly added with agitation to substantially 2000 parts of water maintained at substantially 20 to 30° C. The solid thus precipitated was filtered off, thoroughly washed with water and dried. The yield of crude dibenzo-thiazyl-disulphide obtained by the process described above was 96% of theoretical. After purifying the crude dibenzo-thiazyl-disulphide for example by washing out any traces of mercaptobenzothiazole with boiling acetone, in which mercaptobenzothiazole is readily soluble, and then recrystallizing the mercaptobenzothiazole free product from a convenient solvent as for example toluene, the dibenzo-thiazyl-disulphide obtained had a melting point of 172° to 176° C.

It is believed the above reaction may be represented as taking place in the following manner:

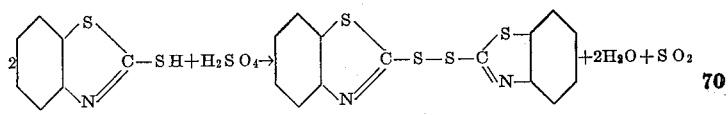

Having thus described the invention it is understood to be limited solely by the claims attached hereto as part of this specification.

What is claimed is:

1. A process for the preparation of a diaryl-thiazyl-disulphide comprising reacting a mercapto-aryl-thiazole with concentrated sulphuric acid.

2. A process for the preparation of a diaryl-thiazyl-disulphide comprising reacting a mercaptobenzothiazole with concentrated sulphuric acid.

3. A process for the preparation of a diaryl-thiazyl-disulphide comprising heating a mercapto-aryl-thiazole with sulphuric acid.

4. A process for the preparation of a diaryl-thiazyl-disulphide comprising heating a mercaptobenzothiazole with concentrated sulphuric acid.

5. A process for the manufacture of dibenzo-thiazyl-disulphide comprising reacting mercaptobenzothiazole with concentrated sulphuric acid.

6. A process for the manufacture of dibenzo-thiazyl-disulphide comprising heating mercaptobenzothiazole with sulphuric acid.

7. A process for the manufacture of dibenzo-thiazyl-disulphide comprising heating mercaptobenzothiazole and concentrated sulphuric acid at substantially 90°-100° C.

8. A process for the manufacture of dibenzo-thiazyl-disulphide comprising heating substantially 800 parts by weight of concentrated sulphuric acid and substantially 200 parts by weight of mercaptobenzothiazole at substantially 90°-100° C.

9. A process for the manufacture of a diaryl-thiazyl-disulphide comprising the steps in combination of adding a mercapto-aryl-thiazole to concentrated sulphuric acid at a temperature of substantially 10 to 20° C., heating the reaction mixture at a temperature of substantially 90 to 100° C., diluting the reaction mixture with water and separating the diaryl-thiazyl-disulphide therefrom.

10. A process for the manufacture of a dibenzo-thiazyl-disulphide comprising the steps in combination of adding a mercapto-benzo-thiazole to concentrated sulphuric acid at a temperature of substantially 10 to 20° C., heating the reaction mixture at a temperature of substantially 90 to 100° C., diluting the reaction mixture with water and separating the diaryl-thiazyl-disulphide therefrom.

11. A process for the manufacture of dibenzo-thiazyl-disulphide comprising the steps in combination of adding mercapto-benzo-thiazole to concentrated sulphuric acid at a temperature of substantially 10 to 20° C., heating the reaction mixture at a temperature of substantially 90 to 100° C., diluting the reaction mixture with water and separating the dibenzo-thiazyl-disulphide therefrom.

12. A process for the manufacture of dibenzo-thiazyl-disulphide comprising the steps in combination of adding mercapto-benzo-thiazole to concentrated sulphuric acid as the sole oxidizing agent thereof at a temperature of substantially 10 to 20° C., heating the reaction mixture to substantially 90 to 100° C., diluting the reaction mixture with water and separating the dibenzo-thiazyl-disulphide therefrom.

MARION W. HARMAN.